J. E. WHIPPLE.
DIRECTION INDICATOR FOR MOTOR VEHICLES.
APPLICATION FILED OCT. 5, 1915.
1,188,591.
Patented June 27, 1916.
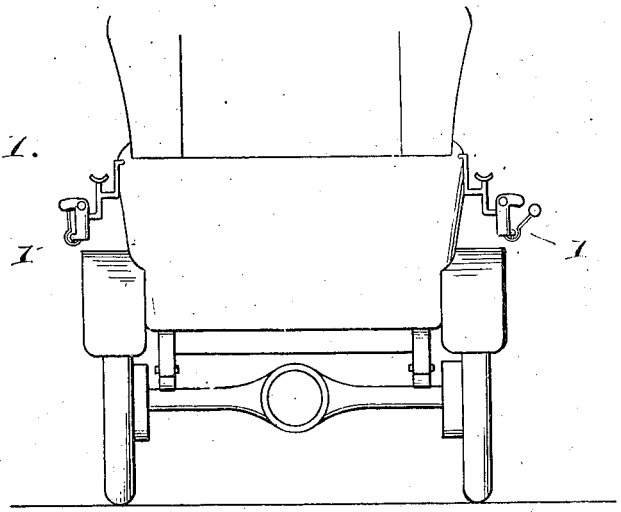
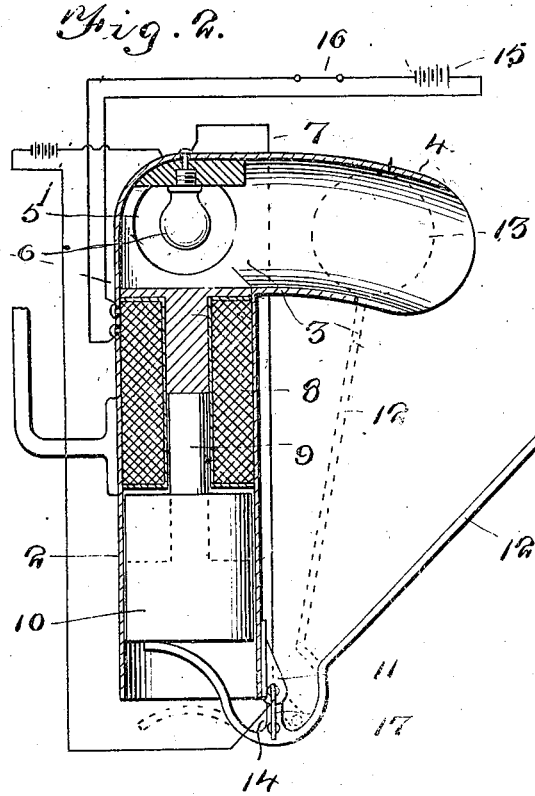
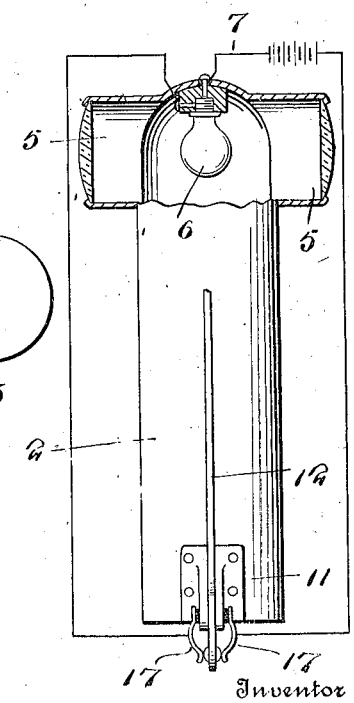
Witnesses
E. R. Ruppert
Jno. McCarthy
Inventor
J. E. Whipple
By Victor J. Evans
Attorney

UNITED STATES PATENT OFFICE.

JESSE E. WHIPPLE, OF COLUMBUS, OHIO.

DIRECTION-INDICATOR FOR MOTOR-VEHICLES.

1,188,591.  Specification of Letters Patent.  Patented June 27, 1916.

Application filed October 5, 1915.  Serial No. 54,203.

*To all whom it may concern:*

Be it known that I, JESSE E. WHIPPLE, a citizen of the United States, residing at Columbus, in the county of Franklin and State of Ohio, have invented new and useful Improvements in Direction - Indicators for Motor-Vehicles, of which the following is a specification.

This invention relates to certain novel and useful improvements in direction indicating devices for motor vehicles.

In carrying out the present invention, it is my purpose to provide a device of the class described whereby the driver of the vehicle may advise the drivers of other vehicles and pedestrians of the direction in which he is about to steer his vehicle so that the drivers of such other vehicles and the pedestrians may govern themselves accordingly.

It is also my purpose to provide a device of the type set forth which will embrace the desired features of simplicity, efficiency and durability, which will operate efficiently and effectively for its intended purpose and wherein the component parts will be so arranged and correlated as to reduce the possibility of derangement to a minimum.

With the above and other objects in view, the invention consists in the construction, combination and arrangement of parts hereinafter set forth in and falling within the scope of the claims.

In the accompanying drawing: Figure 1 is a view in rear elevation of a motor vehicle equipped with direction indicating apparatus constructed in accordance with the present invention. Fig. 2 is a vertical sectional view through one of the devices removed from the vehicle, the electric circuits being shown diagrammatically. Fig. 3 is a view in side elevation of the device.

My direction indicating apparatus embodies companion devices located upon opposite sides of the motor vehicle at the rear end of the latter and as these devices are identical in construction, it is thought that a description of one will suffice for both.

Referring now to the drawing in detail, 1, 1 designate the companion devices of my improved direction indicating apparatus, and, in the present instance, these devices are secured to the supporting brackets, respectively, of the top of the vehicle. Each device 1 embodies a cylindrical casing 2 formed of any suitable material and having the upper end rounded and formed with an opening 3 at the outer side thereof and surrounding the opening 3 and projecting outwardly therefrom is a hood 4. The front and back walls of the casing 2 at the upper extremities thereof are equipped with bull's eyes 5, respectively, and arranged within the upper end of the casing is an electric lamp 6 connected in a supply circuit 7.

Arranged within the casing 2 below the opening 3 is a solenoid 8 appropriately secured within the casing and provided with a core 9 having the lower end thereof equipped with a weight 10.

Secured to the outer side wall of the casing 2 adjacent to the lower end thereof are pivot ears 11.

12 indicates an arm arranged alongside of the outer side wall of the casing 2 and having the upper end thereof equipped with a signal blade 13 normally disposed within the hood 4 and the lower end portion curved outwardly and then upwardly and working within a slot in the bottom of the casing 2. Formed on the curved portion of the arm 12 and projecting into the ears 11 and pivoted between such ears is a finger 14.

The solenoids 8 of the respective devices 1 are connected in circuit with a suitable source of electrical energy 15 and are under the control of switches 16 respectively so that such solenoids may be energized independently of each other.

In practice, when the driver of the vehicle is about to turn his vehicle in one direction and wishes to notify the drivers of other vehicles and pedestrians of his intention, he closes the particular switch 16, thereby energizing the controlled solenoid 8. Upon the energization of the solenoid 8, the core 9 is drawn upwardly into such solenoid, thereby elevating the weight 10 and as the weight 10 is normally in engagement with the lower end of the arm 12, such end of the arm is relieved of the holding influence of the weight so that the blade 13 may swing out of the hood 4 from the dotted line position in Fig. 2 to the full line position. In the present instance, circuit closers 17 are under the control of the respective arms 12 and each circuit closer is connected in series with the adjacent lamp 6. When the arm 12 swings outwardly, such arm actuates the controlled circuit closer 17 to close the circuit of the lamp 6 and energize the latter and the light rays from the lamp are projected through the hood 4 and onto the signal blade 13 with the effect to illuminate the latter.

While I have herein shown and described one preferred form of my invention by way of illustration, I wish it to be understood that I do not limit or confine myself to the precise details of construction herein described and delineated, as modification and variation may be made within the scope of the claims, and without departing from the spirit of the invention.

I claim:

1. In direction indicating apparatus for motor vehicles comprising companion devices, each comprising a casing disposed at one side of the vehicle and having the outer side thereof formed with an opening, a lamp within the casing at the opening therein, a hood surrounding said opening and projecting outwardly from the casing, an arm pivoted to the lower end of the casing and normally lying adjacent to the outer side thereof, a blade on the upper end of said arm disposed within said hood, and means acting upon said arm to hold the blade normally within the hood, and adapted to release the arm whereby the blade may swing out of the hood, and means for energizing said lamp so that the light rays may be projected through the hood onto said blade.

2. In direction indicating apparatus for motor vehicles, companion devices disposed upon opposite sides of the vehicle respectively and each comprising a casing, an arm pivoted upon the casing and normally lying adjacent to the outer side thereof, a blade on the upper end of said arm, the lower end of said arm being curved upwardly and disposed within the bottom of the casing, a weight within the bottom of the casing normally resting upon the lower curved end of the arm and holding the blade in inactive position, and means for elevating said weight to release said arm so that the blade may swing to active position.

3. In direction indicating apparatus for motor vehicles, companion devices disposed upon opposite sides of the vehicle respectively and each comprising a casing, an arm pivoted upon the casing and normally lying adjacent to the outer side thereof, a blade on the upper end of said arm, the lower end of said arm being curved upwardly and disposed within the bottom of the casing, a weight within the bottom of the casing normally resting upon the lower curved end of the arm and holding the blade in inactive position, and an electroresponsive device within said casing operable to elevate said weight to release said arm so that the blade may swing to active position.

In testimony whereof I affix my signature in presence of two witnesses.

JESSE E. WHIPPLE.

Witnesses:
CHAS. G. SCHENCK, Jr.,
DURBIN W. AGLER.

Copies of this patent may be obtained for five cents each, by addressing the "Commissioner of Patents, Washington, D. C."